(12) United States Patent
Laube et al.

(10) Patent No.: US 8,752,377 B2
(45) Date of Patent: Jun. 17, 2014

(54) DEVICE FOR COOLING CHARGE AIR

(75) Inventors: Thomas Laube, Leonberg (DE);
Michael Wessels, Bietigheim-Bissingen (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 392 days.

(21) Appl. No.: 13/181,953

(22) Filed: Jul. 13, 2011

(65) Prior Publication Data
US 2012/0017877 A1   Jan. 26, 2012

(30) Foreign Application Priority Data

Jul. 23, 2010   (DE) .......................... 10 2010 036 591

(51) Int. Cl.
*F02B 33/44*     (2006.01)
*F02B 29/04*     (2006.01)
*F02B 33/00*     (2006.01)
*F28F 7/00*      (2006.01)

(52) U.S. Cl.
USPC ................ 60/612; 60/599; 123/563; 165/185

(58) Field of Classification Search
CPC  F02B 29/0412; F02B 29/0437; Y02T 10/146
USPC .................. 60/599, 612, 605.1; 123/542, 563, 123/559.1; 165/104.19, 185
IPC ....................................................... F02B 29/04
See application file for complete search history.

(56) References Cited

U.S. PATENT DOCUMENTS

| | | | | |
|---|---|---|---|---|
| 2,766,744 A * | 10/1956 | Steiger | ........................... | 123/563 |
| 3,232,042 A * | 2/1966 | Sarra | .............................. | 123/563 |
| 4,273,082 A * | 6/1981 | Tholen | ........................... | 123/563 |
| 6,837,195 B2 * | 1/2005 | Suwazono | ................. | 123/559.1 |
| 6,910,469 B2 * | 6/2005 | Renkonen | ..................... | 123/563 |
| 7,076,955 B2 * | 7/2006 | Herz et al. | ...................... | 60/612 |

(Continued)

FOREIGN PATENT DOCUMENTS

| | | | |
|---|---|---|---|
| CN | 101137826 A | 3/2008 | |
| DE | 19840616 C1 * | 12/1999 | .............. F02B 29/04 |

(Continued)

OTHER PUBLICATIONS

German Search report issued on Mar. 24, 2011, in related Application No. DE 10 2010 036 591.2 (with partial English translation), The related Application No. DE 10 2010 036 591.2 has a request date of Jul. 23, 2010.

(Continued)

*Primary Examiner* — Thai Ba Trieu
(74) *Attorney, Agent, or Firm* — RatnerPrestia

(57) ABSTRACT

A device for cooling charge air, specifically for cooling charge air which is compressed in a compressor of at least one exhaust-gas turbocharger and which is to be supplied to an internal combustion engine, wherein at least two charge-air coolers are arranged in a common housing, specifically in such a way that charge air to be cooled can be supplied separately to the charge-air coolers arranged in the common housing via in each case one separate incoming-air chamber provided by the common housing, and that cooled charge air can be discharged jointly from the charge-air coolers arranged in the common housing via a common outgoing-air chamber provided by the common housing.

5 Claims, 3 Drawing Sheets

(56) References Cited

U.S. PATENT DOCUMENTS

| | | | |
|---|---|---|---|
| 7,096,860 B2 * | 8/2006 | Reuss | 123/563 |
| 7,165,403 B2 | 1/2007 | Sun et al. | |
| 7,353,102 B2 * | 4/2008 | Narita et al. | 60/612 |
| 7,380,401 B2 * | 6/2008 | Henn et al. | 60/612 |
| 7,703,282 B1 | 4/2010 | Meissner et al. | |
| 8,028,522 B2 * | 10/2011 | Irmler et al. | 123/563 |
| 8,418,679 B2 | 4/2013 | Döring et al. | |
| 2007/0163258 A1 * | 7/2007 | Narita et al. | 60/612 |
| 2011/0154818 A1 * | 6/2011 | Takahata | 60/599 |

FOREIGN PATENT DOCUMENTS

| | | | | |
|---|---|---|---|---|
| DE | 102004014669 | | 10/2005 | |
| DE | 102004030259 | | 11/2005 | |
| FR | 2873799 | A1 | 2/2006 | |
| JP | 53049614 | A * | 5/1978 | F02B 29/04 |
| JP | 59190426 | A * | 10/1984 | F02B 29/04 |
| JP | 2003-97277 | A | 4/2003 | |
| JP | 2003-97278 | A | 4/2003 | |
| JP | 2008-223740 | A | 9/2008 | |
| RU | 2083855 | C1 | 7/1997 | |
| WO | 2005116415 | | 12/2005 | |

OTHER PUBLICATIONS

Examination Report of corresponding Chinese Patent Application No. 2011 10214237.6, filed Jul. 22, 2011.

* cited by examiner

DEVICE FOR COOLING CHARGE AIR

CROSS-REFERENCE TO RELATED APPLICATION

This U.S. patent application claims priority to German Patent Application DE 102010036591.2, filed Jul. 23, 2010, which is incorporated by reference herein in its entirety.

FIELD OF THE INVENTION

The invention relates to a device for cooling charge air. The invention also relates to a motor vehicle having a supercharged internal combustion engine.

BACKGROUND OF THE INVENTION

An effective measure for reducing the fuel consumption and CO2 emissions of motor vehicles has proven to be a reduction in swept volume in conjunction with supercharging of the internal combustion engine, so-called downsizing. In interaction with a direct injection of fuel, it is possible here to generate considerable potential for the reduction of fuel consumption and CO2 emissions. This is achieved in particular by means of reduced internal friction, by means of a shift of the operating point of the internal combustion engine into higher load ranges, and not least by means of a reduction of the weight of the internal combustion engine as a result of smaller swept volumes and/or a reduced number of cylinders. For the most effective possible supercharging of an internal combustion engine, so-called charge-air cooling is prior art.

FIG. 1 shows a schematic diagram of a motor vehicle having a supercharged internal combustion engine 10, wherein the internal combustion engine 10 in FIG. 1 has two cylinder banks or cylinder groups 11 with in each case three cylinders 12. Each cylinder group 11 is assigned in each case one exhaust-gas turbocharger 13, wherein each exhaust-gas turbocharger 13 comprises in each case one turbine 14 and in each case one compressor 15. Exhaust gas flowing out of the cylinders 12 of the cylinder groups 11 is expanded in the turbines 14 of the exhaust-gas turbochargers 13, wherein energy gained here is used to drive the respective compressor 15 of the respective exhaust-gas turbocharger 13 in order to compress charge air, which is conducted via an air filter 16, in the compressors 15 of the exhaust-gas turbochargers 13 and to conduct said compressed charge air via charge-air coolers 17 such that the charge air compressed in the compressors 15 is thereby cooled in the charge-air coolers 17. In FIG. 1, each exhaust-gas turbocharger 13 is assigned a separate charge-air cooler 17, wherein the charge air exiting the charge-air coolers 17 after having been cooled is supplied via a common throttle flap 18 and via a common collector 19 to the cylinders 12 of the cylinder groups 11. Accordingly, in FIG. 1, the charge-air flows are merged downstream of the charge-air coolers 17 and upstream of the throttle flap 18.

It should be pointed out at this juncture that it is likewise already known from the prior art to provide a separate collector for each cylinder bank 11, wherein then the cooled charge air exiting the charge-air coolers 17 is supplied to the respective collectors via separate throttle flaps.

In motor vehicles known from practice which have a supercharged internal combustion engine and a plurality of charge-air coolers, the individual charge-air coolers are formed as separate assemblies. This can result in installation space problems if charge-air coolers formed as separate assemblies are to be integrated into a motor vehicle with limited installation space. Furthermore, if a plurality of charge-air coolers formed as separate assemblies are integrated into a motor vehicle, there are resulting disadvantages with regard to the weight of the motor vehicle and with regard to the assembly time required for assembly.

SUMMARY OF THE INVENTION

Taking this as a starting point, an object on which the present invention is based is that of providing a novel device for cooling charge air and a motor vehicle having a supercharged internal combustion engine and novel charge-air cooling.

Said object is achieved, according to a first aspect, by means of a device for cooling charge air, specifically for cooling charge air which is compressed in a compressor of at least one supercharging device and which is to be supplied to an internal combustion engine, wherein at least two charge-air coolers are arranged in a common housing, specifically in such a way that charge air to be cooled can be supplied separately to the charge-air coolers arranged in the common housing via in each case one separate incoming-air chamber provided by the common housing, and that cooled charge air can be discharged jointly from the charge-air coolers arranged in the common housing via a common outgoing-air chamber provided by the common housing.

According to that aspect of the invention, at least two charge-air coolers are arranged in a common housing, specifically in such a way that charge air to be cooled can be supplied separately to the charge-air coolers arranged in the common housing via in each case one separate incoming-air chamber provided by the common housing, and that cooled charge air can be discharged jointly from the charge-air coolers arranged in the common housing via a common outgoing-air chamber provided by the common housing.

According to a second aspect, the invention is achieved by means of a device for cooling charge air, specifically for cooling charge air which is compressed in a compressor of a supercharging device and which is to be supplied to an internal combustion engine, wherein at least two charge-air coolers are arranged in a common housing, specifically in such a way that charge air to be cooled can be supplied jointly to the charge-air coolers arranged in the common housing via a common incoming-air chamber provided by the common housing, and that cooled charge air can be discharged separately from the charge-air coolers arranged in the common housing via in each case one separate outgoing-air chamber provided by the common housing.

According to that aspect of the invention, at least two charge-air coolers are arranged in a common housing, specifically in such a way that charge air to be cooled can be supplied jointly to the charge-air coolers arranged in the common housing via a common incoming-air chamber provided by the common housing, and that cooled charge air can be discharged separately from the charge-air coolers arranged in the common housing via in each case one separate outgoing-air chamber provided by the common housing.

With both aspects of the present invention, it is proposed that a plurality of charge-air coolers be arranged in a common housing, that is to say that a plurality of charge-air coolers be combined to form one module and therefore one assembly.

In this way, it is firstly possible to provide a compact design of a device for cooling charge air, and there are secondly resulting cost and weight advantages and also a reduction in the required assembly time.

According to another aspect of the invention, a motor vehicle has a supercharged internal combustion engine, the internal combustion engine comprising at least two cylinder banks or cylinder groups with in each case a plurality of cylinders, each cylinder group being assigned in each case a separate supercharging device, for example an exhaust-gas turbocharger, and it being possible in each of the supercharging devices for compressed charge air to be conducted via a device for cooling charge air, in order to cool the compressed charge air before it is supplied into the cylinders of the cylinder groups, such that charge air compressed in each of the supercharging devices can be supplied via in each case one separate incoming-air chamber to a separate charge-air cooler, and furthermore, charge air cooled in the charge-air coolers can be supplied via a common outgoing-air chamber and via a common throttle flap and a common collector to the cylinders of the cylinder groups.

According to another aspect of the invention, a motor vehicle has a supercharged internal combustion engine, the internal combustion engine comprising at least two cylinder banks or cylinder groups with in each case a plurality of cylinders, the cylinder groups being assigned a common supercharging device, and it being possible for charge air compressed in the supercharging device to be conducted via a device for cooling charge air, in order to cool the compressed charge air before it is supplied into the cylinders of the cylinder groups, such that charge air compressed in the common supercharging device can be supplied via a common incoming-air chamber to a separate charge-air cooler for each cylinder group, and furthermore, charge air cooled in the charge-air coolers can be supplied via separate outgoing-air chambers and via separate throttle flaps and separate collectors to the cylinders of the respective cylinder group.

BRIEF DESCRIPTION OF THE DRAWINGS

Preferred refinements of the invention will emerge from the following description. An exemplary embodiment of the invention will be explained in more detail on the basis of the drawing, without the invention being restricted to said exemplary embodiment. In the drawing.

DETAILED DESCRIPTION OF THE PREFERRED EMBODIMENTS

The present invention relates to a device for cooling charge air, specifically for cooling charge air which is compressed in a compressor of at least one supercharging device and which is to be supplied to an internal combustion engine, and to internal combustion engines having such a device for cooling charge air. Within the context of the present invention, the supercharging device is designed as an exhaust-gas turbocharger, scroll-type supercharger, electric supercharger or mechanical compressor.

Figure 2:
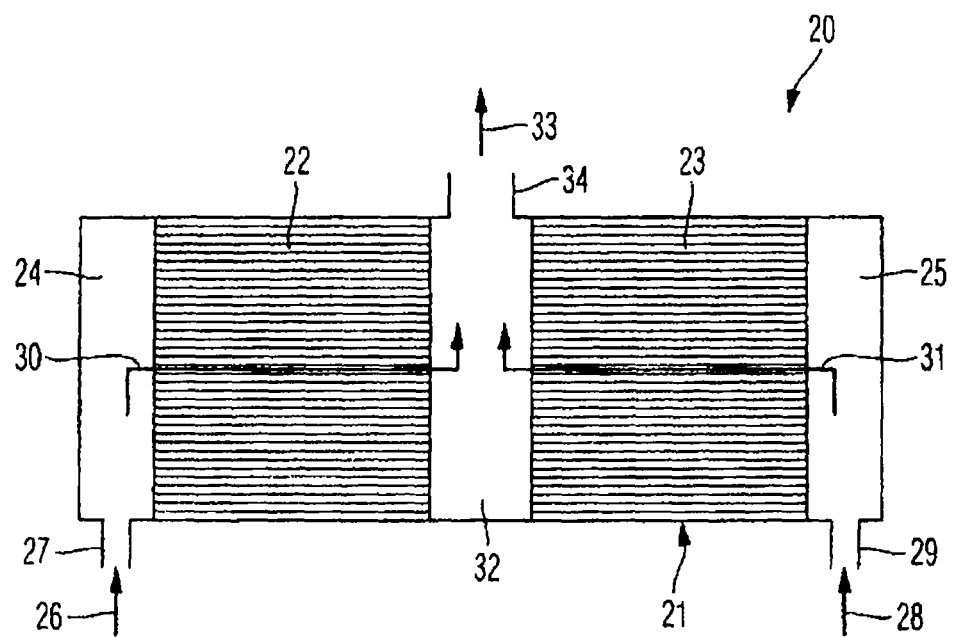
FIG. 2 shows a schematic illustration of a device according to aspects of the invention for cooling charge air according to a first aspect of the invention.

FIG. 2 shows a device 20 according to aspects of the invention for cooling charge air according to a first aspect of the present invention, wherein charge air which is compressed in a compressor of at least one exhaust-gas turbocharger and which is to be supplied to an internal combustion engine, specifically to cylinders thereof, is cooled in the device 20 shown in FIG. 2.

The device 20 according to FIG. 2 has a housing 21 in which are arranged a plurality of charge-air coolers 22, 23, specifically two charge-air coolers in the exemplary embodiment shown. According to FIG. 2, the two charge-air coolers 22, 23 are arranged in the housing 21 of the device 20 in such a way that charge air to be cooled can be supplied to the charge-air coolers 22, 23 arranged in the common housing 21 via in each case one separate incoming-air chamber 24 and 25 respectively. Charge air to be cooled can thus be supplied to the incoming-air chamber 24 in the direction of the arrow 26 via an incoming-air port 27, whereas charge air to be cooled can be supplied to the incoming-air chamber 25 in the direction of the arrow 28 via an incoming-air port 29.

The charge air to be cooled which is introduced into the incoming-air chamber 24 is conducted in the direction of the arrow 30 via the charge-air cooler 22, whereas the charge air to be cooled which is supplied to the incoming-air chamber 25 is conducted in the direction of the arrow 31 via the charge-air cooler 23.

The housing 21, in which the two charge-air coolers 22 and 23 are positioned, of the device 20 also provides a common outgoing-air chamber 32, wherein both the charge air conducted via the charge-air cooler 22 and also the charge air conducted via the charge-air cooler 23 is conducted into the outgoing-air chamber 32 according to the arrows 30 and 31 in order to be mixed in the outgoing-air chamber 32 and discharged out of the device 20 as cooled charge air in the direction of the arrow 33 via an outgoing-air port 34 of the outgoing-air chamber 32 and supplied to the internal combustion engine.

Figure 1:
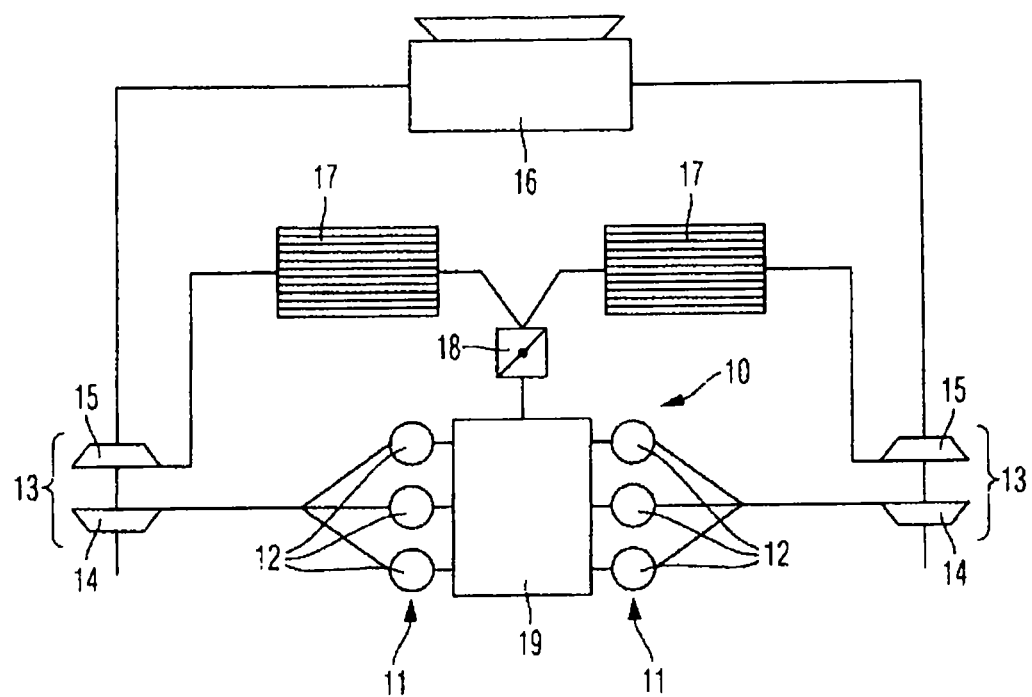
FIG. 1 shows a schematic diagram of a motor vehicle having a supercharged internal combustion engine, such as is known from the prior art.

The device 20 according to aspects of the invention for cooling charge air shown in FIG. 2 may be used as a replacement for the charge-air coolers 17 formed as separate assemblies and shown in FIG. 1, wherein then cooled charge air is supplied from the outgoing-air port 34 to the common throttle flap 18 and to the common collector 19 of the cylinder banks 11.

If the internal combustion engine is one which has for example twelve or sixteen cylinders, four exhaust-gas turbochargers may be provided, wherein then, a cylinder group of in each case three cylinders or a cylinder group of in each case four cylinders is assigned a common exhaust-gas turbocharger. In this case, two devices 20 according to aspects of the invention as per FIG. 2 may be installed in a motor vehicle of said type in order to supply compressed charge air from in each case two exhaust-gas turbochargers to such a device 20 according to aspects of the invention.

In a further advantageous refinement of the invention, at least one low-temperature cooler may be fastened to the common housing 21 of the device 20 of FIG. 2, wherein such a low-temperature cooler serves for example for cooling electrical components of a motor vehicle and/or for cooling a refrigerant of an air-conditioning system. A low-temperature cooler of said type is then impinged on or flowed through by the same cooling air as the charge-air coolers 22, 23 of the device 20 according to aspects of the invention. The level of functional integration can be increased in this way. Further cost and weight savings and reductions in assembly time can be attained.

According to a further advantageous refinement of the invention, brackets and/or fastening means in particular for electrical lines, water-conducting hoses or pipes may be formed on the common housing 21 of the device 20 according to aspects of the invention. The level of functional integration can be further increased in this way. Further cost and weight reductions and reductions in assembly time are possible in this way. It is for example possible for a scavenging blower, a blower or mechanical or electric ram-air flaps to be integrated on the housing 21 of the device 20.

As already stated, the device 20 according to aspects of the invention of FIG. 2 is used in particular in a motor vehicle having a supercharged internal combustion engine which comprises two cylinder banks or cylinder groups with in each case one exhaust-gas turbocharger. In this case, proceeding from the exhaust-gas turbochargers, charge air compressed therein is supplied separately to the separate incoming-air chambers 24, 25 in order to then be supplied, after the cooling of the charge air, from the common outgoing-air chamber 32 via a common throttle flap and a common collector to the cylinders of the cylinder banks or cylinder groups 11 of the internal combustion engine.

Figure 3:
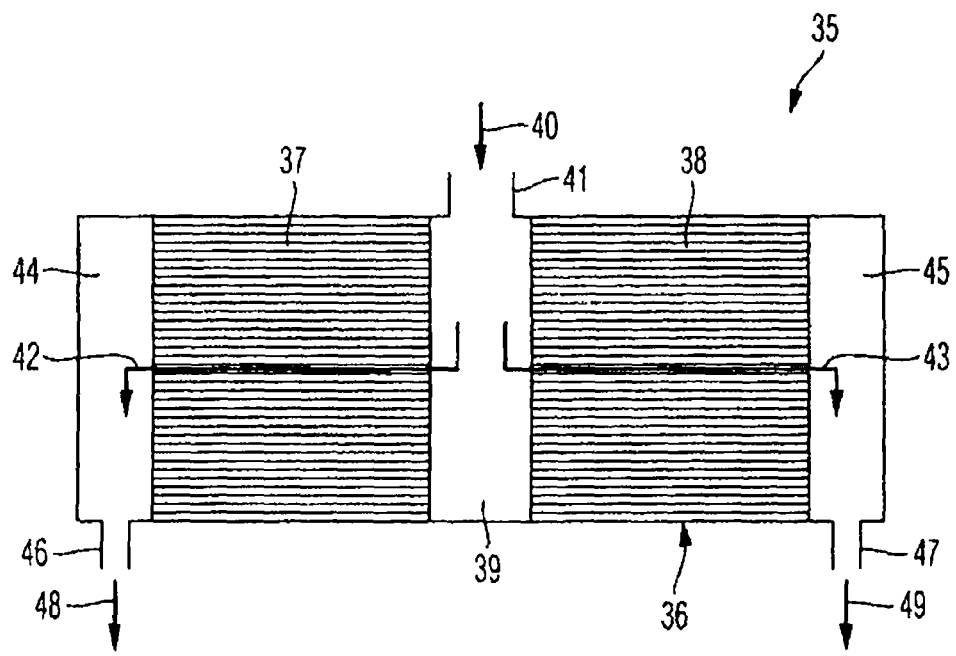
FIG. 3 shows a schematic illustration of a device according to aspects of the invention for cooling charge air according to a second aspect of the invention.

A device 35 according to a second aspect of the present invention is shown in FIG. 3, wherein it is also the case in the device 35 of FIG. 3 that two charge-air coolers 37, 38 are positioned or arranged in a common housing 36. In the exemplary embodiment of FIG. 3, the two charge-air coolers 37 and 38 are positioned in the common housing 36 such that charge air to be cooled can be introduced into a common incoming-air chamber 39 of the device 35, specifically in the direction of an arrow 40 via an incoming-air port 41 of the incoming-air chamber 39. The common incoming-air chamber 39 of the two charge-air coolers 37 and 38 of the device 35 according to FIG. 3 is provided by the common housing 36.

The charge air to be cooled which is introduced into the common incoming-air chamber 39 is conducted from the common incoming-air chamber 39 via the two charge-air coolers 37, 38, that is to say a first partial quantity of the charge air is conducted in the direction of the arrow 42 via the charge-air cooler 37 and a second partial quantity of the charge air is conducted in the direction of the arrow 43 via the charge-air cooler 38.

The two charge-air coolers 37, 38, which are positioned in the common housing 36 of the device 35 according to FIG. 3, are assigned separate outgoing-air chambers 44 and 45 respectively, which are likewise provided by the common housing 36. Each of the two separate outgoing-air chambers 44, 45 has an outgoing-air port 46 and 47, wherein charge air cooled by the charge-air cooler 37 is discharged from the device 35 according to aspects of the invention proceeding from the outgoing-air chamber 44 in the direction of the arrow 48 via the outgoing-air port 46, whereas charge air cooled by the charge-air cooler 38 is discharged from the device 35 according to aspects of the invention proceeding from the outgoing-air chamber 45 in the direction of the arrow 49 via the outgoing-air port 47.

The device 35 according to aspects of the invention as per FIG. 3 is used in particular if, on an internal combustion engine having two cylinder banks or cylinder groups, only one exhaust-gas turbocharger is provided via which, at one side, the exhaust gas of both cylinder banks is conducted and by means of which, at the other side, charge air for both cylinder banks is compressed. In this case, the charge air compressed by the exhaust-gas turbocharger for both cylinder banks is introduced in the direction of the arrow 40 into the common incoming-air chamber 39 of the device 35 and, proceeding from the outgoing-air chambers 44 and 45, is supplied via separate throttle flaps and separate collectors to the cylinders of the two cylinder banks or cylinder groups.

With regard to the remaining details, the exemplary embodiment of FIG. 3 corresponds to the exemplary embodiment of FIG. 2, such that, in order to avoid unnecessary repetition, reference is made to the above statements.

Figure 4:
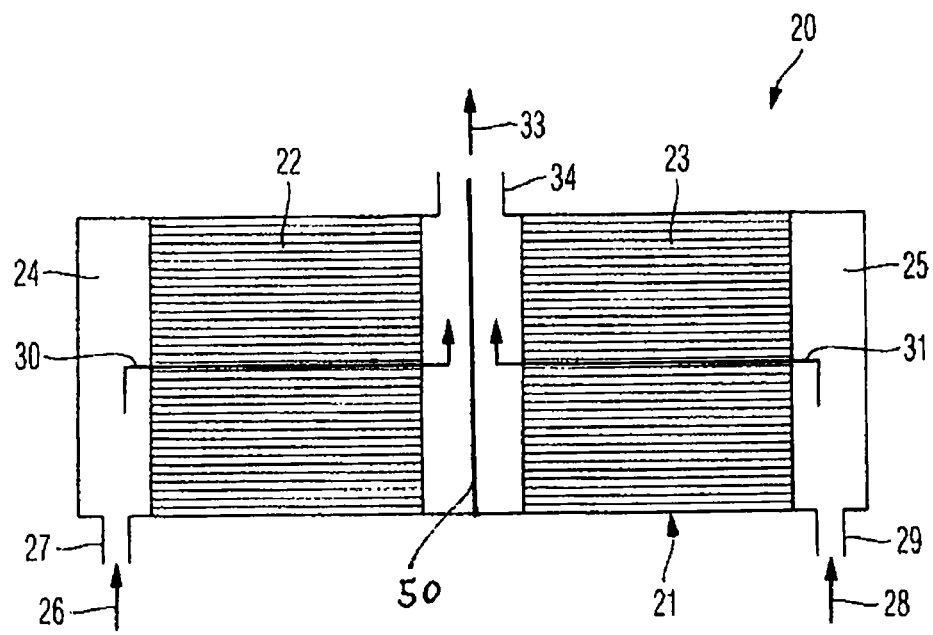
FIG. 4 shows a schematic illustration of a device according to aspects of the invention for cooling charge air according to a third aspect of the invention.

The device 20 for cooling charge air according to aspects of the invention and shown in FIG. 4 has, in comparison with the design shown in FIG. 2, an additional partition 50 which serves for the targeted guidance of the charge air within the outgoing-air chamber 32 and by means of which a mixing of the two charge-air flows within the device 20 is prevented.

Figure 5:
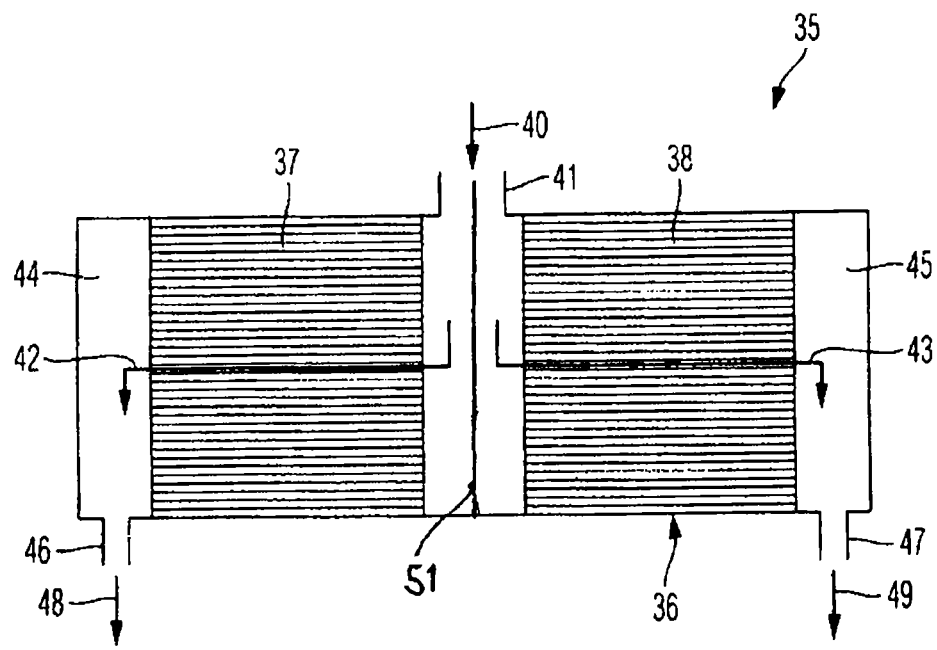
FIG. 5 shows a schematic illustration of a device according to aspects of the invention for cooling charge air according to a fourth aspect of the invention.

The device 35 for cooling charge air according to aspects of the invention and shown in FIG. 5 has, in comparison with the design shown in FIG. 3, an additional partition 51 which serves for the targeted guidance of the charge air within the incoming-air chamber 39 and by means of which a mixing of the two charge-air flows within the device 35 is prevented.

The invention relates to a device 20, 35 for cooling charge air, specifically for cooling charge air which is compressed in a compressor of at least one exhaust-gas turbocharger and which is to be supplied to an internal combustion engine, wherein at least two charge-air coolers 22, 23 are arranged in a common housing 21, 36, specifically in such a way that charge air to be cooled can be supplied separately to the charge-air coolers 22, 23 arranged in the common housing 21 via in each case one separate incoming-air chamber 24, 25 provided by the common housing 21, and that cooled charge air can be discharged jointly from the charge-air coolers 22, 23 arranged in the common housing 21 via a common outgoing-air chamber 32 provided by the common housing 21.

LIST OF REFERENCE NUMERALS

10 Internal combustion engine
11 Cylinder bank/Cylinder group
12 Cylinder
13 Exhaust-gas turbocharger
14 Turbine
15 Compressor
16 Air filter
17 Charge-air cooler
18 Throttle flap
19 Collector
20 Device
21 Housing
22 Charge-air cooler
23 Charge-air cooler
24 Incoming-air chamber
25 Incoming-air chamber
26 Arrow
27 Incoming-air port
28 Arrow
29 Incoming-air port
30 Arrow
31 Arrow
32 Outgoing-air chamber
33 Arrow
34 Outgoing-air port
35 Device
36 Housing
37 Charge-air cooler
38 Charge-air cooler
39 Incoming-air chamber
40 Arrow
41 Incoming-air port
42 Arrow 43 Arrow
44 Outgoing-air chamber
45 Outgoing-air chamber
46 Outgoing-air port
47 Outgoing-air port
48 Arrow
49 Arrow
50 Partition
51 Partition

The invention claimed is:

1. A device for cooling charge air which is compressed in a compressor of at least one supercharging device and which is to be supplied to an internal combustion engine, said device comprising:
- at least two charge-air coolers arranged in a common housing in such a way that charge air to be cooled is supplied separately to the charge-air coolers arranged in the common housing via, in each case, one separate incoming-air chamber of the common housing,
- wherein cooled charge air can be is discharged jointly from the charge-air coolers arranged in the common housing via a common outgoing-air chamber of the common housing, and
- wherein the common outgoing-air chamber is configured to be connected to a common throttle flap.

2. The device as claimed in claim 1, wherein charge air to be cooled flows through the charge-air coolers arranged in the common housing.

3. The device as claimed in claim 1, wherein charge air to be cooled and cooling air flow through the charge-air coolers arranged in the common housing.

4. A motor vehicle having a supercharged internal combustion engine and a device for cooling charge air,
- the internal combustion engine of the motor vehicle comprising at least two cylinder banks or cylinder groups with, in each case, a plurality of cylinders, each cylinder group being assigned, in each case, a separate supercharging device,
- the device for cooling charge air comprising at least two charge-air coolers arranged in a common housing in such a way that charge air to be cooled is supplied separately to the charge-air coolers arranged in the common housing via, in each case, one separate incoming-air chamber of the common housing, wherein cooled charge air is discharged jointly from the charge-air coolers arranged in the common housing via a common outgoing-air chamber of the common housing, wherein the common outgoing-air chamber is configured to be connected to a common throttle flap,
- wherein in each of the supercharging devices compressed charge air is conducted via the device for cooling charge air in order to cool the compressed charge air before it is supplied into the cylinders of the cylinder groups,
- wherein charge air compressed in each of the supercharging devices is supplied via, in each case, one of the separate incoming-air chambers to one of the separate charge-air coolers,
- wherein charge air cooled in the charge-air coolers is supplied via the common outgoing-air chamber and via the common throttle flap and a common collector to the cylinders of the cylinder groups.

5. The motor vehicle of claim 4, wherein each supercharging device is an exhaust-gas turbocharger.

* * * * *